United States Patent
Oehring et al.

(10) Patent No.: US 11,181,879 B2
(45) Date of Patent: *Nov. 23, 2021

(54) MONITORING AND CONTROL OF PROPPANT STORAGE FROM A DATAVAN

(71) Applicant: U.S. Well Services, Inc., Houston, TX (US)

(72) Inventors: Jared Oehring, Houston, TX (US); Brandon N. Hinderliter, Houston, TX (US); Arthur Baron, Houston, TX (US)

(73) Assignee: U.S. Well Services, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/377,861

(22) Filed: Apr. 8, 2019

(65) Prior Publication Data

US 2020/0073353 A1 Mar. 5, 2020

Related U.S. Application Data

(63) Continuation of application No. 15/235,716, filed on Aug. 12, 2016, now Pat. No. 10,254,732, which is a
(Continued)

(51) Int. Cl.
*E21B 43/267* (2006.01)
*G05B 19/042* (2006.01)
*G05B 19/46* (2006.01)

(52) U.S. Cl.
CPC ........ *G05B 19/0428* (2013.01); *E21B 43/267* (2013.01); *G05B 19/46* (2013.01);
(Continued)

(58) Field of Classification Search
CPC .............................. E21B 43/26; E21B 43/267
See application file for complete search history.

(56) References Cited

U.S. PATENT DOCUMENTS 1,656,861 A 1/1928 Leonard
1,671,436 A 5/1928 Melott
(Continued)

FOREIGN PATENT DOCUMENTS

AU 2007340913 7/2008
CA 2406801 11/2001
(Continued)

OTHER PUBLICATIONS

International Search Report and Written Opinion dated Apr. 10, 2019 in corresponding PCT Application No. PCT/US2019/016635.
(Continued)

*Primary Examiner* — Kenneth L Thompson
(74) *Attorney, Agent, or Firm* — Hogan Lovells US LLP (57) ABSTRACT

A system and method that remotely monitors and controls proppant usage in a fracturing operation. The system and method allow operators to wirelessly monitor and control proppant storage units from inside a datavan through sensors and control mechanisms that interface with fracturing software to schedule the flow of the proppant. A sensor monitors the weight, container level, or volume of the proppant being used to keep the induced hydraulic fracture open. A serial to Ethernet converter converts this information and sends it wirelessly to a datavan. A user at the datavan controls the proppant usage through a display in the datavan of the storage units with the appropriate weight. The container monitoring software links with the fracturing software, providing real-time information about proppant usage so that the user can properly schedule proppant flow to the well through valves, conveyor belts, and other control mechanisms.

14 Claims, 2 Drawing Sheets

Related U.S. Application Data continuation-in-part of application No. 15/202,085, filed on Jul. 5, 2016, now Pat. No. 10,337,308, which is a continuation of application No. 13/679,689, filed on Nov. 16, 2012, now Pat. No. 9,410,410.

(60) Provisional application No. 62/204,331, filed on Aug. 12, 2015.

(52) U.S. Cl.
CPC ............. *G05B 2219/37303* (2013.01); *G05B 2219/45004* (2013.01)

(56) References Cited

U.S. PATENT DOCUMENTS

| | | |
|---|---|---|
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,922,463 A | 5/1990 | Del Zotto et al. |
| 5,004,400 A * | 4/1991 | Handke ................. B65G 43/08 198/524 |
| 5,006,044 A | 4/1991 | Walker, Sr. |
| 5,025,861 A | 6/1991 | Huber |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,230,366 A | 7/1993 | Marandi |
| 5,334,899 A | 8/1994 | Skybyk |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,517,822 A | 5/1996 | Haws et al. |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,798,596 A | 8/1998 | Lordo |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,788,022 B2 | 9/2004 | Sopko |
| 6,802,690 B2 | 10/2004 | Han |
| 6,808,303 B2 | 10/2004 | Fisher |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,795,830 B2 | 9/2010 | Johnson |
| 7,807,048 B2 | 10/2010 | Collette |
| 7,835,140 B2 | 11/2010 | Mori |
| 7,845,413 B2 | 12/2010 | Shampine et al. |
| 7,926,562 B2 | 4/2011 | Poitzsch |
| 7,894,757 B2 | 7/2011 | Keast |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,506,267 B2 | 8/2013 | Gambier et al. |
| 8,534,235 B2 | 9/2013 | Chandler |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |

(56) References Cited

U.S. PATENT DOCUMENTS

| | | |
|---|---|---|
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,260,253 B2 * | 2/2016 | Naizer .................. B65G 43/00 |
| 9,322,239 B2 | 4/2016 | Angeles Boza et al. |
| 9,324,049 B2 | 4/2016 | Thomeer |
| 9,340,353 B2 * | 5/2016 | Oren .................... B65D 90/587 |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 * | 11/2016 | McIver ................ B60P 1/6427 |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring |
| 9,909,398 B2 * | 3/2018 | Pham .................... E21B 43/12 |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 * | 7/2019 | Broussard ............... E21B 43/26 |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela |
| 10,627,003 B2 | 4/2020 | Dale et al. |
| 10,648,311 B2 | 5/2020 | Oehring et al. |
| 10,669,471 B2 | 6/2020 | Schmidt et al. |
| 10,669,804 B2 | 6/2020 | Kotrla |
| 10,695,950 B2 | 6/2020 | Igo et al. |
| 10,711,576 B2 | 7/2020 | Bishop |
| 10,740,730 B2 | 8/2020 | Altamirano et al. |
| 10,794,165 B2 | 10/2020 | Fischer et al. |
| 2001/0000996 A1 | 5/2001 | Grimland et al. |
| 2002/0169523 A1 | 11/2002 | Ross et al. |
| 2003/0056514 A1 | 3/2003 | Lohn |
| 2003/0079875 A1 | 5/2003 | Weng |
| 2003/0138327 A1 | 7/2003 | Jones et al. |
| 2004/0040746 A1 | 3/2004 | Niedermayr et al. |
| 2004/0102109 A1 | 5/2004 | Cratty et al. |
| 2004/0167738 A1 | 8/2004 | Miller |
| 2005/0061548 A1 | 3/2005 | Hooper |
| 2005/0116541 A1 | 6/2005 | Seiver |
| 2005/0201197 A1 | 9/2005 | Duell et al. |
| 2005/0274508 A1 | 12/2005 | Folk |
| 2006/0052903 A1 | 3/2006 | Bassett |
| 2006/0065319 A1 | 3/2006 | Csitari |
| 2006/0109141 A1 | 5/2006 | Huang |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantei et al. |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2009/0045782 A1 | 2/2009 | Datta |
| 2009/0065299 A1 | 3/2009 | Vito |
| 2009/0072645 A1 | 3/2009 | Quere |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |

(56) References Cited

U.S. PATENT DOCUMENTS

| | | |
|---|---|---|
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case et al. |
| 2011/0081268 A1 | 4/2011 | Ochoa et al. |
| 2011/0085924 A1 | 4/2011 | Shampine |
| 2011/0110793 A1 | 5/2011 | Leugemores et al. |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard |
| 2014/0174717 A1 | 6/2014 | Broussard et al. |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ciezobka |
| 2017/0226839 A1 | 8/2017 | Broussard |
| 2017/0226842 A1 | 8/2017 | Omont et al. |
| 2017/0234250 A1 | 8/2017 | Janik |

(56) References Cited

U.S. PATENT DOCUMENTS

| | | |
|---|---|---|
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye et al. |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0156210 A1 | 6/2018 | Oehring |
| 2018/0181830 A1 | 6/2018 | Luharuka et al. |
| 2018/0183219 A1 | 6/2018 | Oehring |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang |
| 2018/0343125 A1 | 11/2018 | Clish |
| 2018/0363437 A1 | 12/2018 | Coli |
| 2018/0363640 A1 | 12/2018 | Kajita et al. |
| 2019/0003329 A1 | 1/2019 | Morris |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0316447 A1 | 10/2019 | Oehring |
| 2020/0047141 A1 | 2/2020 | Oehring et al. |
| 2020/0088152 A1 | 3/2020 | Allion et al. |
| 2020/0232454 A1 | 7/2020 | Chretien |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 2016/144939 | 9/2016 |
| WO | 2016/160458 | 10/2016 |
| WO | 2018044307 A1 | 3/2018 |
| WO | 2018213925 A1 | 11/2018 |

OTHER PUBLICATIONS

Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.

(56) References Cited

OTHER PUBLICATIONS

Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.
International Search Report and Written Opinion dated Feb. 15, 2019 in related PCT Patent Application No. PCT/US18/63977.
International Search Report and Written Opinion dated Mar. 5, 2019 in related PCT Patent Application No. PCT/US18/63970.
Non-Final Office Action dated Feb. 25, 2019 in related U.S. Appl. No. 16/210,749.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Jul. 9, 2019 in corresponding PCT Application No. PCT/US2019/027584.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Final Office Action dated Mar. 31, 2020 corresponding to U.S. Appl. No. 15/356,436.
Non-Final Office Action dated Mar. 3, 2020 corresponding to U.S. Appl. No. 16/152,695.
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Canadian Office Action dated Aug. 17, 2020 in related CA Patent Application No. 2,944,968.
Canadian Office Action dated Aug. 18, 2020 in related CA Patent Application No. 2,933,444.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.

(56) References Cited

OTHER PUBLICATIONS

"Process Burner" (https://www.cebasrt.com/productsloii-gaslprocess-burner) 06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wiklpedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Morris et al., U.S. Appl. No. 62/526,869; Hydration-Blender Transport and Electric Power Distribution for Fracturing Operation; filed Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.

\* cited by examiner

MONITORING AND CONTROL OF PROPPANT STORAGE FROM A DATAVAN

CROSS-REFERENCE TO RELATED APPLICATIONS

This application is a continuation of U.S. patent application Ser. No. 15/235,716, filed on Aug. 12, 2016, which is now U.S. Pat. No. 10,254,732, issued Apr. 9, 2019, which claims priority to U.S. Provisional Patent Application No. 62/204,331 filed on Aug. 12, 2015 and is a continuation-in-part of, and claims priority to and the benefit of co-pending U.S. patent application Ser. No. 15/202,085 filed Jul. 5, 2016, which is a continuation of U.S. patent application Ser. No. 13/679,689, filed on Nov. 16, 2012, which is now U.S. Pat. No. 9,410,410, issued Aug. 9, 2016, the full disclosures of which are hereby incorporated by reference herein for all purposes.

BACKGROUND OF THE INVENTION

1. Technical Field

Embodiments of the present disclosure relate to systems and methods for wirelessly monitoring and controlling proppant usage in real time in a hydraulic fracturing operation.

2. Description of Related Art

Horizontal drilling and hydraulic fracturing are two ways in which unconventional sources of hydrocarbons can be tapped to provide energy resources. Hydraulic fracturing (fracking) operations typically require powering numerous components in order to recover oil and gas resources from the ground. For example, pumps that inject fracking fluid down the wellbore, blenders that mix proppant into the fluid, cranes, wireline units, and many other components all must perform different functions in concert to carry out fracturing operations.

Fracturing operations are highly complex and involve pumping fracturing fluid at a high pressure to hydraulically fracture the reservoir rock in the well in order to form fractures and stimulate production of hydrocarbons. The formed fractures can then be used to access hydrocarbons that could not have been accessed with traditional oil & gas well techniques. The fracturing fluid that is pumped down into the well usually includes a proppant that is a solid particulate such as sand or ceramic beads. In many known fracking systems, proppant, such as sand, glass beads, ceramic material, bauxite, dry powders, rock salt, benzoic acid, fiber material, or cement plastics, is mixed with other materials and enhances the flow capacity of the fractures. The proppant props open the fractures and remains in the fractures after the end of the hydraulic fracturing operation.

The proppant is supplied to the blenders and mixers and then to the well through a proppant delivery system located at the wellsite. The proppant is usually stored in large containers that are heavy and are connected to conveyor belts which lead to other mixing equipment and finally into the wellbore, where the mixture is pumped into the reservoir. The containers usually are refilled at the site by trucks that come in and empty the proppant into them. Gates are controlled by the user to open and close the proppant containers. However, in this operational scenario operators of the hydraulic fracturing system need to be stationed outside at the containers using hydraulic valves, or a short range wireless remote control that is hand held for controls.

The operators report in to the datavan using a radio headset to communicate the container weights or fill levels. This is inconvenient and there are not always extra personnel available for the task. Also, having a worker walk over to the container to adjust the flow takes minutes, which is a long time to have to manually check the proppant level. Further there is airborne silica around the container, which can cause silicosis. Silicosis is lung fibrosis caused by inhalation of dust containing silica. Silica is usually found in the sand used as a proppant. Operators are also exposed to dangerous weather in extremely cold, hot, or hazardous environments. Also, operators would normally have to determine what container and how much to use manually, which can lead to operator error. The incorrect aggregate of proppant could be used by selecting the wrong container.

Another issue with the manual control of the containers is that when the gates controlling proppant flow from the containers are left open spilling product, this causes profit loss. It also causes environmental harm and there is a major safety concern. When a wrong container is open and the incorrect aggregate or proppant is sent out to be mixed with the fracturing slurry, it is hard to figure out what tank the proppant came from and can result in a violation of customer contract. There is also confusion that occurs at the pre-stage planning because operators are unsure what container is being used and how the containers are being scheduled for later use.

These and other problems with manually monitoring and controlling the proppant usage have been observed in the field.

SUMMARY OF THE INVENTION

The method and system of the present invention provide real-time remote monitoring of proppant, such as sand and glass beads, as it is being fed from proppant containers and mixed into the fracturing fluid. Operators inside a datavan are able to wirelessly monitor the weight, container level or volume of the proppant and control the proppants in the proppant containers through remote monitoring software in a datavan.

Embodiments of systems and methods of the present disclosure include a proppant container with control box connected to a sensor for monitoring the amount of proppant, an RS232 or RS435 serial data protocol on the control box, a wireless Ethernet converter to send the signal from the control box located at the proppant container, a wireless receiver with signal out ports for serial or Ethernet ports to receive the data from the sensor to the datavan and a piece of software on an information handling system in the datavan that computes the total and allows the user to interface with the fracturing control software to schedule proppant usage and flow.

Embodiments of the invention include software that acquires and displays the proppant data to a user in a datavan, and power supplies that supply power to the serial to Ethernet converter, measuring sensor, and transmitter.

Embodiments of the invention also include wireless control of the storage containers and conveyor belts.

Embodiments of the invention include a serial to Ethernet converter that takes the serial data output from a sensor at a proppant container and converts it to the Ethernet protocol to be sent to a datavan with an Ethernet receiver where it is processed and displayed to a user who is monitoring and controlling the proppant flow. The software also allows for scheduling and remote monitoring of the weight, volume and amount of proppant in each proppant container. The monitoring software, which receives the signal from the proppant equipment can also communicate with fracturing software in the datavan to allow for more automation of the fracturing process as a whole.

Embodiments of the invention can schedule and automate which containers to run the proppant from, allowing for the proper mixture of proppants from different containers to make up the fracturing fluid.

Embodiments of the invention can relay the container weight to a datavan information handling system, a personal laptop or a separate Human Machine Interface (HMI) mounted in the datavan.

Embodiments of the present invention measure the containers weight by gamma ray gauges, radar gauges, laser gauges, and ultrasonic gauges. Also weight measuring load cells and pressure sensors along the vertical height of the vessel can be used.

Embodiments of the invention include that the communications can be wired or wireless.

Embodiments of the invention can convert the serial data to wireless, but it is possible to transmit the signal without converting it first.

Embodiments of the invention can include only the monitoring of the proppant flow and not control.

Embodiments of the invention can be used on several type of proppant storage containers including silos, capable of holding 200,000 lbs to 300,000 lbs, kings, or sand hogs, large trailer mounted containers similar to a fracturing tank on wheels that holds from 300,000 lbs to 400,000 lbs, or smaller individual proppant boxes, which hold from 40,000 lbs to 60,000 lbs and can be set directly on a conveyor belt.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION OF THE PREFERRED EMBODIMENT

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

The present invention provides a system and method for wirelessly monitoring and controlling proppant flow from proppant storage containers in a hydraulic fracturing operation. The proppant can include sand, glass beads and other known materials that is mixed into a fracturing fluid and that is pumped through a wellbore into a well in order to create fractures and extract hydrocarbons. The proppant storage containers can be stationary or attached to a trailer and can be of various sizes depending on the application.

Components of a system for monitoring proppant usage and flow can include a control box at the proppant container with sensors which are coupled to the proppant storage container and have serial connections, such as RS232 or RS485 serial connectors, a wireless Ethernet converter to send data signals indicating the readings of the sensors that monitor the weight of the container in real time, and a wireless receiver with signal out ports for serial or Ethernet that receives the signals sent from the control box and formulates them for viewing to a user in a datavan. A variety of power supplies can be used to power the converters. In addition, the software to acquire and display the data, as well as to communicate with the fracturing control software can be included as well. For the control of the storage, there can be a control box outside or inside the proppant storage containers that can contain wiring and a display for operations that is wirelessly connected to the datavan.

Figure 1:
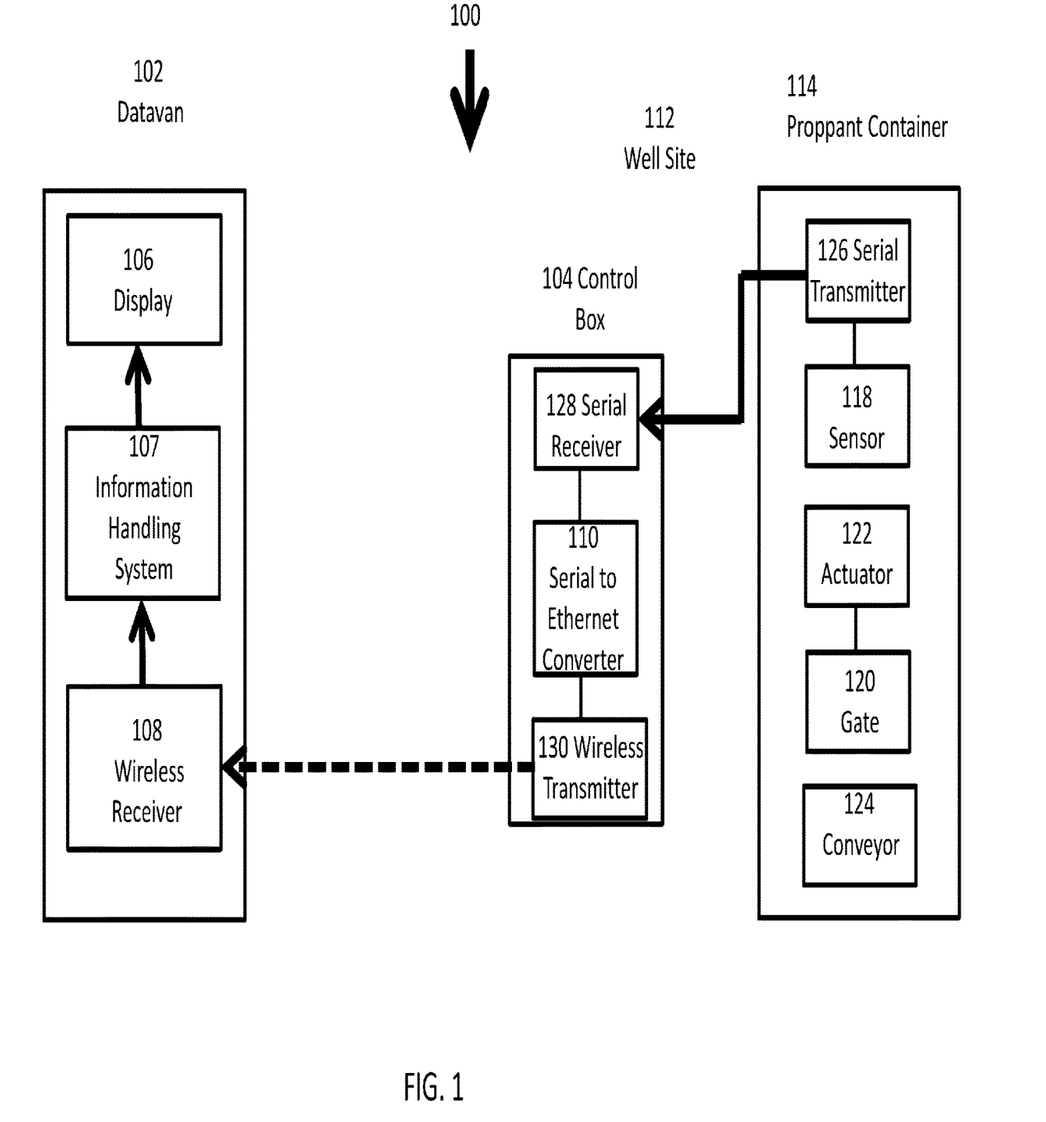
FIG. 1 is a block diagram of an embodiment of the present invention.

FIG. 1 shows in schematic form an embodiment of a system 100 for remote and real-time monitoring of proppant storage in a container. In one example of the system 100, there is a datavan 102 where a user operates an information handling system 107 with a processor and memory for storing computer readable media accessible by the processor with instructions and with a display 106. The information handling system 107 may also include nonvolatile storage area accessible by the processor, and logics for performing each of the steps described herein. In the illustrated example, the information handling system 107 interfaces with a wireless receiver 108 that can be connected to a LAN or other type of wireless network through normal wireless connections or serial to Ethernet devices. Serial to Ethernet devices can be provided by Moxa (640 Herman Road, Suite 5, Jackson, N.J. 08527, http://www.moxastore.com), which manufactures serial to Ethernet devices and servers. Other wireless receivers can also be customized for this particular application. Due to the distances between equipment being up to 400 feet, and other electromagnetic inference, Ethernet may not be reliable and therefore another suitable long range protocol may be used such as Radio Frequency (AM or FM).

In the exhibit shown in FIG. 1, the datavan 102 communicates with a proppant container 114 through a control box 104 at a well site 112. The proppant monitoring system 100 includes a control box 104 shown connected to a proppant container 114. The control box 104 can contain circuitry and wiring along with computer readable media for storing instructions and a processor and input means for the user to manually operate the container 114. In most embodiments the control box 104 will be attached to and be a part of the proppant container 114. Included in the control box 104 is a serial receiver 128 that can connect to a serial to Ethernet converter 110, also potentially produced by Moxa. The control box 104 can further contain a wireless transmitter 130 for transmitting information to the datavan 102.

Further, the control box 104 has a serial receiver 128 that is connected via a serial cable to a serial transmitter 126 in a proppant container 114. The proppant container has a sensor 118 which monitors the weight of the proppant container 114 and its contents. The sensor 118 gathers information about the weight of the proppant in the container and sends it via serial or analog connection to the serial transmitter 126 to the control box 104 through its own serial receiver 128. That information is then converted by a serial to Ethernet converter 110 and sent via wireless transmitter 130 to the datavan 102. Proppant can be selectively dispensed from proppant container 114 by opening and closing gate 120, such as with an actuator 122. Sensor readings from sensor 118 are constantly sent back to the datavan 102 through the serial to Ethernet converter 110. There is also a conveyor 124 that can be selectively activated in this embodiment.

The weight of the proppant container 114 and its contents can be relayed to one or more of the datavan information handling system 107, a personal laptop, and/or a separate human machine interface (HMI) mounted in the datavan 102 through the control box 104. In the datavan a wireless receiver 108 receives the data (wireless transmission is indicated by a dashed line in FIG. 1) and then the information is sent to the information handling system 107 and displayed to the user via a display 106 in multiple formats. The connections between the wireless receiver 108 and the information handling system 107 can be Ethernet or the wireless receiver can be directly installed in the information handling system 107. Further the connection between the information handling system 107 and the display 106 can be Ethernet or serial connection types.

In addition, the amount of proppant in the proppant container 114 can be gauged by measuring its total weight and subtracting the weight of the proppant container 114 itself, such as with a load cell. In one example a load cell includes a strain gauge that mounts to the proppant container 114 and emits a signal that is representative of the weight of proppant in the proppant container 114. This embodiment is not limited to any one sensor and there are several different ways an accurate weight measurement can be obtained. Optionally, volume of the proppant can be measured. Gamma ray (radioactive) gauges, radar gauges, laser gauges, and ultrasonic gauges can optionally be used in place of weight measuring load cells or as a redundancy to load cells. Even pressure sensors along the vertical height of the proppant container 114 can be used. Furthermore, the communications can be either wired or wireless. Although the above-discussed embodiments seek to convert the serial communications to Ethernet, it is possible to transmit serial data wirelessly without converting it. Proppant is tracked based on weight using load cells, and if a level sensor is used such as a gamma, radar, laser or sonic sensor, then the geometry of the container is taken into consideration when the weight is calculated. An algorithm is used that takes into account the current proppant level, the proppant weight per volume, the density of the proppant and the geometry of the container.

According to one embodiment of the invention shown in FIG. 1, the signal and electrical characteristics of communications associated with the control box 104 and weight sensor 118 can be in accordance with Serial RS232 or RS485 protocol standards. Serial RS232 or RS485 protocols are standard communications protocols within the industry and other embodiments of the invention can include different standards. Optionally the operation of the control box 104 and weight sensor 118 can be in accordance with Ethernet standards, and the data from these devices transmitted wirelessly to the datavan 102. The datavan 102 can then receive the wireless signal and output it to display 106. The display 106 shows a representation of each container and a number with the appropriate scale weight. To keep each container unconfused and receiving properly, an output signal and an input signal can be separated on respectively numbered com ports. For example, container one can be received through com port one, container two can be routed to com port two, etc. Another option is to order the data sent in the serial stream so that the first value in the data packet can pertain to the weight of the first container, the second value can pertain to the second container, and so on.

In an example of operation, the weight or volume of the proppant (or sand) in the proppant container 114 is monitored, either instantaneously or over time, and compared to a designated weight (or volume) or change in weight (or volume) over time. To ensure a sufficient amount of proppant is on hand in the container(s) 114 for use in the fracturing process, a threshold low point of proppant in the container 114 is established, and operations protocol is to keep the amount of proppant in the container 114 to be at least or greater than the threshold low point. Thus an advantage of employing the monitoring system 100 described herein is that by monitoring the proppant amount in the container 114 with the controls described herein, if the threshold low point is approached, or soon to be approached, proppant can be added to that particular container 114. In another example of operation, if a rate change of weight of a proppant container 114 deviates from a designated value, the gate 120 on the particular proppant container 114 can be adjusted so that the rate change of weight is at or close to the designated value. Excursions of the rate change of weight from the designated value, which can be less than or greater than the designated rate change of weight of the proppant container, can indicate that the amount of proppant being dispensed from the container 114 exceeds a capacity of proppant handling hardware, such as a conveyor, thereby resulting in spillage of proppant, or generating proppant dust. This can be corrected (via monitoring software in the information handling system) that identifies the rate of weight change excursion and contains instructions to send controlling commands to the actuator 122 that in turn adjust a position of the gate 120 to affect a flow of proppant from the container 114. Additionally, monitoring a rate of weight change of a proppant container 114 can provide an indication of how much, if any, proppant is being dispensed from the container 114. Thus if it is desired that proppant be dispensed from a one of the containers 114, but not from another one of the containers 114, logics in the information handling system 107 can compare monitored rate weight changes of proppants in the containers 114 to determine if proppant is being dispensed from designated proppant containers 114, and if not, command signals can be transmitted from the information handling system 107 to the actuator 122 to open a gate 120 on a container 114 from which proppant is to be dispensed, and close a gate 120 on a container 114 from which proppant is not to be dispensed.

Figure 2:
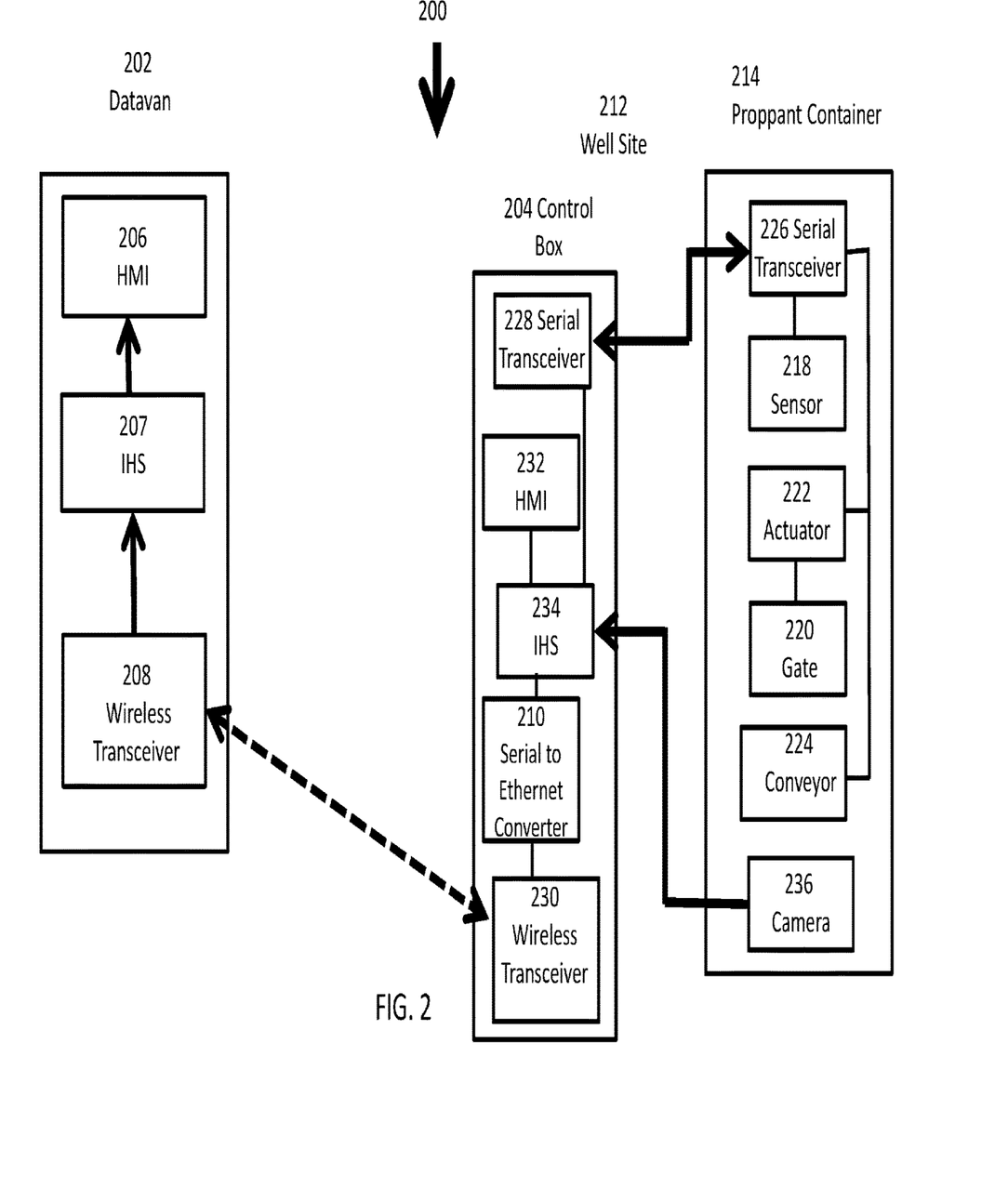
FIG. 2 is a block diagram of a second embodiment of the invention.

FIG. 2 shows in schematic form an alternate embodiment of a system 200 for monitoring and controlling proppant flow. The wireless proppant monitoring and controlling system 200 of FIG. 2 includes a datavan 202 with a wireless connection inside via a wireless transceiver 208. The datavan 202 can contain a human machine interface (HMI) 206 such as a display and an information handling system (IHS) 207 with a processor, memory and storage for storing the data gathered through the wireless connection. A control box 204 contains a serial transceiver 228 that selectively communicates with a sensor 218 for monitoring the weight of the proppant container 214 and its contents via a serial transceiver 226.

In the example of FIG. 2, the information is transmitted after it is sent from the sensor 218 via analog connection from a serial transceiver 226 to another serial transceiver 228 in the control box 204. The information is then sent through a serial connection to another information handling system (IHS) 234 in the control box 204. This IHS 234 may have another human machine interface (HMI) 232 connected to it for access by a user. The IHS 234 then selectively converts the data through a serial to Ethernet converter 210 and sends it back to the datavan 202 through a wireless transceiver 230 on the control box 204 where it is processed by the wireless transceiver 208. The datavan 202 can control an actuator 222 on the proppant container 214 by sending a control command through the HMI 206 connected to the IHS 207 at the datavan 202 through the wireless transceiver 208 to the control box 204. The wireless transceiver 230 in the control box 204 receives the command, converts it to serial through the serial to Ethernet converter 210, sends it to the IHS 234, which then sends it to the proppant container 214 through the serial transceiver 228. A serial transceiver 226 at the proppant container receives the command and actuates the actuator 222 connected to the gate 220. The serial transceiver 226 can also actuate the conveyor 224 as shown in FIG. 2.

The information related to the weight of the container from the sensor 218 can also be catalogued and displayed to a user in the datavan 202. The information can be updated in real time through the wireless connection in the datavan 202 and the user can also control the operations of the conveyor belts 224 and actuator 222 that release the proppant through an actuator 222, which in some embodiments is an proportional hydraulic valve, into the mixing system by interfacing with fracturing software that is also stored in the datavan 202. In one embodiment there are multiple computers in the datavan, one that is in charge of proppant delivery and another for the fracturing operation. These different computers run programs that can share data between themselves. In another embodiment the proppant monitoring and control system will be integrated into fracturing software which monitors the entire fracturing operation.

To control proppant flow from the containers, the same software can be modified to send commands through the same wireless transceiver 208 on the datavan 202 to the wireless transceiver 230 at the control box 204 at the well site 212 where it can then be converted back to serial for use by the control box's own IHS 234 to open/close sand gates, speed up/slow down the conveyor belt 224, etc. The monitoring and control system that receives the signal from the control box 204 and proppant container 214 can also communicate with a portion of the fracturing system in the datavan 202 to allow for a higher level of automation if desired (as described below). Proppant in the container 214 may be released through the wireless control of the valve gate 220 located at the container 214. This can release proppant onto a conveyor 224 for mixing into the fracturing slurry. This data can be used with the data that is gathered from the weight sensor 218 to more accurately control the proppant flow.

In some alternate embodiments, the system 200 allows for two way communications to allow for monitoring and control of the container 214 and conveyor belt (also referred to as a dual belt) 224. In addition, system 200 can be used on several different types of proppant storage containers including silos (tall containers similar to farm silos capable of holding 200,000 lbs to 300,000 lbs), sand kings (sometimes called sand hogs, large trailer mounted containers similar in idea to a frac tank on wheels, capable of holding 300,000 lbs to 400,000 lbs), or sand boxes (which are smaller containers which are set on top of the conveyor belt and unloaded which can contain 40,000 lbs to 60,000 lbs). The sand equipment units can be electric powered, diesel powered, gravity fed, and/or solar powered. In addition, the system 200 is not limited to use with vertical sand silos, but the can be applied to other sand storage equipment as well. Various sensors can be added to the system to control the flow of proppant and weight and the embodiment described above should not be limited to a single configuration.

One advantage of the system 200 is the ability to keep personnel away from air born silica that exists around proppant storage units, and which can cause silicosis or other health problems. Silicosis is lung fibrosis caused by the inhalation of dust containing silica. Operators can also be kept out of the weather in extremely cold, hot, or hazardous environments. Another advantage is the removal of human error of dispensing proppant from the wrong storage container. In some embodiments of the invention, there are multiple gates on the container or containers and different levels of open and close for the multiple gates that can be set by the user at the datavan. Some gates can only open fully or close fully as well depending on the application.

In some embodiments, a live video feed can be directed from the container 214 to the datavan 202 through a camera 236 that sends a Radio-Frequency (RF) signal back to the IHS 234 at the control box 204, thereby making it possible to know instantly if a gate 220 was left open, spilling product on the ground and costing profit loss or causing an environmental or safety hazard, or conversely, if a gate commanded to open was stuck shut due to a mechanism failure. An improperly operating gate can cause the failure of a fracturing operation. This information is converted to wireless and transmitted to the datavan 202. Datavan operators can also use the video feed to determine if the wrong container was opened, causing an incorrect aggregate to be mixed into the fracturing slurry. The same weight monitoring can also allow datavan operators to see if a certain container is being unloaded into which will help prevent confusion regarding logistics and pre-stage planning.

Set points for proppant delivery and conveyor speed can be a simple PID closed feedback loop. A sensor can monitor the speed of the conveyor and that sensor sends a signal to the datavan via the system to indicate if the desired speed has been reached. If the sensor indicates it has reached the proper speed, then the conveyor will hold the speed. If it indicates the speed value has been overshot, the system will send out a command signal to slow down the belt. This process is repeated multiple times until the correct weight goal has been achieved by the system The P, I, and D values will determine the stability and response time of the control system, and these values are dependent upon the user's desired response times, and the determined amount of overshoot and undershoot that is tolerable in the positioning of the gate. User entered set points for the desired weight of sand remaining in the container(s) will signal the end of the job once that weight is reached and will trigger the gate(s) to close, thus ending the feedback control loop. Further, other components in the fracturing system, such as the blender can alter these values as part of the overall fracturing software depending on the uses of the system.

According to certain embodiments, which include multiple containers, it is possible to schedule and automate which of these containers to access. For example, the fracturing system can issue a command to close a 40/70 aggregate sand container, while simultaneously issuing a command to open a 20/40 aggregate container. In an embodiment, closing a particular sand (or proppant) container involves closing the gate 220 on the container 214 through which proppant/sand is dispensed from the container 214 to suspend the flow of proppant from the container 214. Similarly, in one example, opening a container 214 is done by opening the respective gate 220 on the container 214 so that proppant can be dispensed to a designated conveyor 224. Opening and closing the gates 220 can be performed by activating the respective actuators 222 coupled with the gates 220. The speed of a belt on conveyor 224 can be controlled remotely, as well as the container outlet gate 220 which can be choked to control the amount of sand being fed to the belt. If wellhead pressure exceeds a set point, or if an emergency stop (E-Stop/E-Kill) button or emergency power off (EPO) button is pressed, the gates 220 on the containers can be automatically closed thereby preventing lost product (proppant). The conveyor belt 224 can also be linked to the E-Stop and EPO in case of an emergency.

The connections between the HMI 206 and the IHS 207 can be serial or Ethernet. The dashed line in FIG. 2 represents wireless communications between the wireless transceiver 230 in the control box 204 and the wireless transceiver in the datavan 202, but also wired communications can be used as well. The HMI 232 on the control box 204 can also be external or internal and the IHS 234 can be a small programmable logic control device. The actuator 222 can also be an electrical or air actuator instead of a proportional hydraulic valve. Additionally, the conveyor can be a part of the proppant container, or a separate piece of equipment.

A further embodiment of the invention includes a blender that is connected to the IHS 207 of the datavan 202. The blender can have an information handling system and a human machine interface that communicates with the datavan 202 in order to further control the proppant flow. The blender is capable of making changes to the proppant flow in a similar manner as the datavan 202. The blender can send control signals to the datavan 202 through its own information handling system to the IHS 207 of the datavan indicating a certain flow of proppant and these signals can be sent to the control box 204 and the proppant container 214. Therefore any changes requested by a user operating the blender are taken into consideration when delivering the proppant. The connections can be either serial or Ethernet, but are not limited in this embodiment.

Embodiments of the system 200 described herein allow for the wireless monitoring and control of proppant and proppant storage containers 214 in a remote location. Proppant container 214 in the embodiment of FIG. 2 contains a single type of proppant, however, it is possible to have multiple proppants in multiple containers with multiple valves actuated remotely, or different compartments in the same container which contain different aggregates of proppant, so that the user in the datavan 202 can schedule a different mixture of proppants for the desired fracturing fluid and application. Persons of ordinary skill in the art will appreciate that the systems and methods described herein are not limited to the particular structures described but that changes to the invention can be made that are consistent with this disclosure.

What is claimed is:

1. A system for use with a fracturing operation comprising:
    a weight monitoring system in selective cooperation with a proppant container that selectively contains proppant used in fracturing;
    an information handling system in communication with the weight monitoring system;
    a proppant dispensing system coupled with the proppant container and that is in communication with and selectively activated by the information handling system;
    a plurality of electric-powered pumps fluidly connected to a well and powered by at least one electric motor; and
    a variable frequency drive connected to the electric motor to control the speed of the motor, wherein the variable frequency drive performs electric motor diagnostics to prevent damage to the at least one electric motor.

2. The system of claim 1, further including a serial to Ethernet converter for sending and receiving Ethernet data to and from the information handling system, and for sending and receiving serial data to and from the proppant container.

3. The system of claim 1, wherein the information handling system selectively sends commands to actuate a valve coupled with the proppant container to provide a designated amount of proppant for use by a fracturing operation.

4. The system of claim 1, where the information handling system alerts a user if an amount of proppant in the proppant container is below a threshold level, and where the information handling system estimates the amount of proppant in the proppant container based on a signal received from the weight monitoring system.

5. The system of claim 1, where the weight monitoring system comprises a sensor for measuring one or more of a weight of the proppant container, a level of proppant in the proppant container, and a volume of proppant in the proppant container, and wherein the sensor comprises a measuring device selected from the group consisting of gamma ray gauges, radar gauges, laser gauges, weight measuring load cells, pressure sensors, ultrasonic gauges, and combinations thereof.

6. The system of claim 1, where the communication is either wired or wireless.

7. The system of claim 1, where the proppant container includes one of a silo or a trailer mounted container.

8. A method for conducting a fracturing operation comprising:
    sensing an amount of proppant contained in at least one proppant storage container;
    comparing the amount of proppant sensed in the proppant storage container with a designated amount of proppant;
    regulating a flow of proppant from the proppant storage container based on the step of comparing the amount of proppant sensed and the designated amount of proppant; and
    controlling the speed of an electric motor powered the electric-powered pumps with a variable frequency drive, wherein the variable frequency drive performs electric motor diagnostics to prevent damage to the electric motor.

9. The method of claim 8, further comprising a scheduling step that includes interfacing with a fracturing system that can actuate valves and other control mechanisms to provide proppant to fracturing operations on conveyor belts.

10. The method of claim 8, further comprising directing an amount of proppant toward a well through the use of conveyor belts that are controlled by a user at a datavan.

11. The method of claim 8, further comprising generating an alert if proppant in the proppant storage container goes below a threshold level.

12. The method of claim 8, where the sensing the amount of proppant in the proppant storage container comprises using a device that is selected from the group consisting of gamma ray gauges, radar gauges, laser gauges, weight measuring load cells, pressure sensors, ultrasonic gauges.

13. The method of claim 8, where the proppant storage containers include one of silos or trailer mounted containers.

14. The method of claim 8, further comprising the step of pumping fluid with a plurality of electric-powered pumps into a wellbore at high pressure so that the fluid passes from the wellbore into the formation, and fractures the formation.

\* \* \* \* \*